US006875805B2

(12) United States Patent
Eustace et al.

(10) Patent No.: US 6,875,805 B2
(45) Date of Patent: Apr. 5, 2005

(54) ACRYLIC MATERIAL

(75) Inventors: Paul Eustace, Ingleby Barwick (GB); Neil Andrew McCathy, Coulby Newham (GB); Nicholas John Marston, Great Ayton (GB)

(73) Assignee: Lucite International UK Limited, Southhampton (GB)

( * ) Notice: Subject to any disclaimer, the term of this patent is extended or adjusted under 35 U.S.C. 154(b) by 0 days.

(21) Appl. No.: 10/446,803

(22) Filed: May 29, 2003

(65) Prior Publication Data

US 2003/0212178 A1 Nov. 13, 2003

Related U.S. Application Data

(63) Continuation of application No. 09/980,629, filed as application No. PCT/GB00/02139 on Jun. 2, 2000, now abandoned.

(30) Foreign Application Priority Data

Jun. 4, 1999  (GB) .............................................. 9912974
Sep. 23, 1999 (GB) .............................................. 9922485

(51) Int. Cl.⁷ ............................ C08K 5/09; C08K 3/22; C08L 27/00
(52) U.S. Cl. ....................... 524/399; 524/409; 524/432; 524/456; 524/567; 523/351; 428/522
(58) Field of Search ................................. 524/399, 432, 524/409, 456, 567; 523/351; 428/522

(56) References Cited

U.S. PATENT DOCUMENTS

| 4,595,724 | A |   | 6/1986 | Koblitz |
| 5,013,782 | A | * | 5/1991 | Tateno ......................... 524/417 |
| 5,036,121 | A | * | 7/1991 | Coaker et al. ............... 524/100 |
| 5,133,899 | A |   | 7/1992 | Nakazawa et al. |
| 5,322,899 | A | * | 6/1994 | Grunewalder et al. ...... 525/199 |
| 5,612,413 | A |   | 3/1997 | Rozkuszka et al. |
| 5,726,234 | A |   | 3/1998 | Herbst et al. |
| 6,043,306 | A | * | 3/2000 | Imahashi ..................... 524/436 |

FOREIGN PATENT DOCUMENTS

| DE | 2937482 | 3/1980 |
| EP | 432 495 | 6/1991 |
| EP | 0 700 965 | 3/1996 |
| EP | 0 781 800 | 7/1997 |
| EP | 857 757 | 8/1998 |
| EP | 1013713 A | 6/2000 |
| GB | 1054877 | 1/1967 |
| JP | 55 40737 | 3/1980 |
| WO | WO 00/37557 | 6/2000 |
| WO | WO 00/59997 | 10/2000 |
| WO | WO 00/75222 | 12/2000 |

OTHER PUBLICATIONS

English–language Abstract : JP 58079047.
English–language Abstract: JP 50089455.
English–language Abstract: HU P8301879A.
English–language Abstract: HU P0005458A.

\* cited by examiner

*Primary Examiner*—Tae H. Yoon
(74) *Attorney, Agent, or Firm*—Venable LLP; Marina V. Schneller

(57) ABSTRACT

An acrylic material which is flame retardant comprises 4.9 to 94.9% by wt of an acrylic composition, 5–95% by wt of a halogen-containing polymer, especially PVC, and 0.1–25% by wt of an inorganic composition comprising at least one of an oxide, hydroxide, carbonate, borate, stearate, chloride or bromide, zinc, magnesium, molybdenum, antimony, aluminum, tin, copper, manganese, cobalt or iron.

32 Claims, No Drawings

ACRYLIC MATERIAL

This application is a Continuation of Ser. No. 09/980,629, filed Mar. 8, 2002 now abandoned, which in turn is a national stage application of PCT/GB00/02139 filed Jun. 2, 2000, which in turn relies on priority of GB 9912974.4 filed Jun. 4, 1999 and of GB 9922485.9 filed Sep. 23, 1999, each of which four applications is relied upon under 36 USC §119 and USC §120 and is incorporated by reference herein.

The present invention relates to a flame retardant acrylic material and a method for its manufacture.

Acrylic materials are used in a wide variety of applications, for example buildings, automotive lights, instrument dials, light diffusers, lenses, medical diagnostic devices, signs, bath/sanitary ware and glazing. Acrylic materials are used because of their toughness, weatherability, appearance and stability characteristics. They may be used as a capstock material to provide a coating layer over a substrate thermoplastic material and hence impart the acrylic characteristics to the thermoplastic material which itself has different characteristics. Examples of such thermoplastic materials in the literature include acrylonitrile-butadiene-styrene (ABS) which is disclosed in U.S. Pat. No. 5,318,737.

In certain application areas for such plastics it may be important that the plastics material can exhibit flame retardant properties. Acrylic materials are not inherently flame retardant. For many building applications materials are required to be tested using BS476 Part 7, which is a surface spread of flame test. Under this test the performance of a material is classified by how far flame travels horizontally along the material. Classes from 1 to 4 are possible, with 4 denoting failure to attain a higher class. A Y suffix may be added to the classification to denote that the material slumped during testing. Extruded polymethylmethacrylate (PMMA) will achieve either the lowest class rating of 4 under the BS476 Part 7 surface spread of flame test or have a Y suffix attached to any higher class due to slumping. Addition of compounds with flame retardant capabilities to acrylic materials are well known in the art. For example use of organic phosphorous compounds as flame retardant materials in acrylic matrices are disclosed in JP06049312-A, GB2212807-A, DE3700373-A and GB2172600-A. J61051047-A discloses a PMMA composition for building material usage which contains calcium aluminate hydrate. This inorganic compound is believed to lose water at temperatures around 300° C. and hence lessen the ability of the acrylic composition to burn. Other inorganic compounds that are known to have some flame retardant properties include various inorganic metal compounds. For example, U.S. Pat. No. 4,965,309 discloses a rigid flame retardant polyvinyl chloride (PVC) composition which contains inorganic zinc, magnesium and molybdenum compounds which are claimed to reduce smoke development on burning of the PVC. PVC itself may be used as an additive to impart flame retardant properties to other polymers.

It is an object of the invention to provide an acrylic material which has enhanced flame retardant properties and a method for its manufacture.

Accordingly, in a first aspect, the present invention provides an acrylic material which comprises:
a) 4.9 to 94.9% by wt of an acrylic composition;
b) 5 to 95% by wt of a halogen containing polymer which contains between 5 to 70% by wt of halogen;
c) 0.1 to 25% by wt of an inorganic composition comprising at least one of an oxide, hydroxide, carbonate, borate, stearate, chloride or bromide of zinc, magnesium, molybdenum, antimony, aluminium, tin, copper, manganese, cobalt or iron.

In a second aspect, there is provided a method of manufacturing an acrylic material which comprises:
a) 4.9 to 94.9% by wt of an acrylic composition;
b) 5 to 95% by wt of a halogen containing polymer which contains between 5 to 70% by wt of halogen;
c) 0.1 to 25% by wt of an inorganic composition comprising at least one of an oxide, hydroxide, carbonate, borate, stearate, chloride or bromide of zinc, magnesium, molybdenum, antimony, aluminium, tin, copper, manganese, cobalt or iron which process comprises melt blending, preferably between 150 to 250° C., said acrylic composition, said halogen containing polymer and said inorganic composition.

Said acrylic composition may comprise a homopolymer or a copolymer (which term includes polymers that have more than two different repeat units) of an alkyl(alk)acrylate or a copolymer comprising acrylonitrile, especially a copolymer which includes styrene and acrylonitrile, optionally in combination with other material (especially polymeric material).

Where said acrylic composition comprises an alkyl(alk)acrylate, it is preferably a homo or copolymer of at least one $C_1$–$C_6$alkyl($C_0$–$C_{10}$alk)acrylate and is more preferably a copolymer made by polymerising a monomer mixture comprising 50–90 wt % of an alkyl methacrylate and 1–50 wt % of an alkyl acrylate. The alkyl methacrylate is preferably a $C_1$–$C_4$ alkyl methacrylate, for example methyl methacrylate. The alkyl acrylate is preferably a $C_1$–$C_4$ alkyl acrylate, for example methyl, ethyl or butyl acrylate. The molecular weight ($M_w$) of the alkyl(alk)acrylate is preferably at least 20,000 and, more preferably, is at least 50,000. The molecular weight may be 500,000 or less, preferably 200,000 or less, more preferably 150,000 or less.

Where said acrylic composition comprises a copolymer comprising acrylonitrile, it may be an acrylic-styrene-acrylonitrile (ASA) polymer, acrylonitrile-EPDM-styrene polymer (AES), styrene-acrylonitrile (SAN) polymer, olefin-styrene-acrylonitrile (OSA) polymer or acrylonitrile-butadiene-styrene (ABS) polymer, with ASA, AES and SAN being preferred.

Suitable copolymers comprising acrylonitrile include at least 15% by wt, more preferably at least 20% by wt, more preferably at least 25% by wt, especially at least 30% by wt of acrylonitrile; and less than 50% by wt, preferably less than 40% by wt, more preferably less than 35% by wt of acrylonitrile.

Suitable copolymers of acrylonitrile include at least 40% by wt, preferably at least 50% by wt, more preferably at least 55% by wt, especially at least 60% by wt styrene; and less than 80% by wt, preferably less than 70% by wt, more preferably less than 65% by wt, of styrene.

Where said polymer comprising acrylonitrile comprises a copolymer comprising acrylonitrile and styrene together with another material, said material may be selected from an olefin, acrylic or EPDM. The amount of the latter mentioned components may be in the range 0 to 20% by wt, preferably 0 to 15% by wt, especially 0 to 10% by wt.

The acrylic composition (especially one comprising an alkyl(alk)acrylate) may comprise between 40–100 wt %, preferably 40–80 wt %, of a copolymer as described above and between 0–60 wt %, preferably 0–40 wt %, more preferably 0–20 wt %, of a rubbery copolymer. By a rubbery copolymer, we mean materials which have a glass transition temperature which is less than room temperature, preferably less than 0° C., e.g. less than –20° C. We also include block copolymers which include a rubbery, low $T_g$ block, often with harder, higher $T_g$ blocks. Such materials are well known for use as toughening agents for improving the impact resistance of acrylic materials. Suitable rubbery copolymers include copolymers of acrylates, methacrylates, styrene, acrylonitrile and/or olefins (especially butadiene). Examples of suitable materials include styrene-butadiene rubbers, styrene-olefin copolymers, methacrylate-butadiene-styrene (MBS) terpolymers, styrene-acrylonitrile copolymers and core-shell type particles based on alkyl acrylates, e.g. butyl acrylate and styrene. Preferred types of rubbery copolymer are core-shell particles based on alkyl acrylates, as described in U.S. Pat. No. 5,318,737.

The halogen containing polymer is preferably a chlorine-containing polymer. The only halogen in said polymer is preferably chlorine. Said polymer may be a chlorinated polyolefin, polyvinyldichloride, polyvinylidene chloride or chlorinated PVC. Said polymer is preferably chosen from a polymer or a copolymer of vinyl chloride or vinylidene chloride. The halogen-containing polymer is preferably polyvinyl chloride (PVC). The halogen containing polymer may contain additives know to those skilled in the art. The halogen containing polymer may contain between 0 to 20% by wt of titanium dioxide or calcium carbonate filler or a mixture of both. Said halogen-containing polymer may include for example pigments, fillers, impact modifiers, lubricants, UV stabilisers, thermal stabilisers and viscosity modifiers. Said halogen containing polymer suitably includes at least 75% by wt of polymer, preferably at least 80% by wt, more preferably at least 90% by wt, especially at least 95% by wt. Said halogen containing polymer may consist essentially of polymer.

Suitably, the halogen containing polymer, when considered in the absence of any fillers or other ingredients (e.g. thermal stabilisers or viscosity modifiers) includes at least 10% by wt, preferably at least 20% by wt, more preferably at least 30% by wt, especially at least 40% by wt and most preferably at least 50% by wt of halogen, especially chlorine. The halogen containing polymer, preferably in the absence of said aforementioned ingredients, preferably includes less than 70% by wt, preferably less than 60% by wt, especially less than 57% by wt halogen, especially chlorine. Preferably, said halogen containing polymer includes no halogen other than chlorine.

Said acrylic material may include at least 10% by wt, preferably at least 20% by wt, more preferably at least 25% wt, especially at least 30% by wt of said halogen containing polymer. Said acrylic material may include 75% wt or less, preferably 60% by wt or less, more preferably 50% by wt or less of said halogen containing polymer.

The halogen containing polymer is preferably compatible with the acrylic composition such that it can be melt blended into the acrylic composition without much difficulty.

Said acrylic material may include at least 15% by wt, suitably at least 24.9% by wt, preferably at least 40% by wt, more preferably at least 50% by wt, especially at least 55% by wt of said acrylic composition. Said acrylic material suitably includes 90% by wt or less, preferably 80% by wt or less, more preferably 70% by wt or less, especially 60% by wt or less of said acrylic composition.

Said inorganic composition preferably includes an anion selected from an oxide, borate, hydroxide or carbonate. A cation of said inorganic composition is preferably selected from antimony, tin, zinc, magnesium and aluminium.

In one embodiment, the inorganic composition may be chosen from at least one of a borate, oxide or hydroxide of aluminium, zinc, iron, magnesium and tin. More preferably the inorganic composition is chosen from two or three of a borate, oxide or hydroxide of aluminium, zinc, iron, magnesium and tin, for example magnesium hydroxide and zinc oxide or magnesium hydroxide and a blend of zinc oxide and tin oxide (commonly referred to as zinc stannate).

Said acrylic material may include at least 0.5% by wt, suitably at least 1% by wt, preferably at least 2% by wt, more preferably at least 3% by wt, especially at least 4% by wt of said inorganic composition. In some cases, said acrylic material may include at least 5% by wt, or even at least 8% by wt. Said acrylic material may include less than 20% by wt, suitably 18% by wt or less, preferably 16% by wt or less, more preferably 14% by wt or less, especially 12% by wt or less of said inorganic composition. Where said inorganic composition includes more than one compound of the type described, the aforementioned amounts preferably refer to the sum of the amounts of respective compounds in said acrylic material.

In general terms, preferably said inorganic composition is arranged to provide at least two different anions and two different cations of the type described herein. In a preferred embodiment, said inorganic composition includes two distinct compounds for providing said two different anions and cations. The ratio of the weight of a first compound to a second compound in the inorganic composition may be at least 0.05, suitably at least 0.1, preferably at least 0.15, more preferably at least 0.18, especially at least 2. The ratio may be less than 10, suitably less than 5, preferably less than 2.5, more preferably less than 1.0, especially 0.5 or less. The % by wt % of said first compound in said acrylic material may be at least 0.5, suitably at least 0.75, preferably at least 1.0, more preferably at least 1.5, especially at least 2. The % by wt of said first compound may be less than 10, preferably less than 5, more preferably 4 or less, especially 2.5 or less. The % by wt of the second compound in said acrylic material may be at least 0.5, suitably at least 1, preferably at least 2.5, more preferably at least 5, especially at least 7.5. The % by wt of the second compound in said acrylic material may be less than 24.9, suitably less than 20, preferably less than 15%, especially 10 or less.

In one preferred embodiment, said first compound is an oxide of antimony and said second compound is magnesium hydroxide.

In another preferred embodiment, said first compound is zinc stannate and said second compound is magnesium hydroxide.

In a further preferred embodiment said inorganic composition comprises zinc stannate, zinc borate and magnesium hydroxide.

Said inorganic composition could include a composite compound arranged to deliver more than one anion or cation, for example magnesite. However, suitably, less than 20% wt, preferably less than 10% wt, more preferably less than 5% wt, especially substantially none of the inorganic composition is made up of a composite compound.

The weight average particle diameter of particles of said inorganic composition is suitably less than 250 μm, preferably less than 100 μm, more preferably less than 50 μm, especially less than 10 μm, suitably so that the material can have a high surface gloss. In some cases, the diameter may be smaller, for example less than 0.1 μm or below. In this case, the particles may be sufficiently small so that they do not scatter light when incorporated into the acrylic material and, accordingly, clear acrylic materials may be made.

The ratio of the weight of said acrylic composition to said halogen containing polymer is preferably at least 0.5, more preferably at least 1, especially at least 1.3. The ratio may be less than 10, suitably less than 5, preferably less than 3, more preferably less than 2, especially 1.5 or less.

The ratio of the weight of said acrylic composition to said inorganic composition may be at least 8, preferably at least 10, more preferably at least 12, especially at least 13. The ratio may be less than 30, suitably less than 25, preferably less than 20, more preferably less than 18, especially less than 16.

Other additives such as UV stabilisers, colourants, lubricants etc that are commonly found in acrylic materials may be present in the acrylic material of the invention.

In a preferred embodiment, the method comprises melt blending by extrusion of the inorganic composition and the acrylic composition together at a temperature between 150 to 230° C., more preferably 180; to 220° C. followed by melt blending with the halogen containing polymer. More preferably the melt blending by extrusion is of all the ingredients together between 150 to 230° C., more preferably 160 to 200° C. and particularly 170 to 195° C.

The acrylic material may be made in the form of sheets, films, powders or granules. It may be used alone or as a capstock material and extruded onto other plastics materials, for example rigid or foamed forms of ABS, PVC, polystyrene polymers including HIPS and other modified styrene polymers, or polyolefins. The material may also be coextruded or laminated onto metals.

Material as described in the form of sheets (e.g. extruded or laminated sheets) may be thermoformed or otherwise formed into a desired shape by a suitable means.

The invention extends to an acrylic material which comprises
a) 24.9 to 94.9% by wt of an acrylic composition;
b) 5 to 75% by wt of a halogen containing polymer which contains between 5 to 70% by wt of halogen;
c) 0.1 to 25% by wt of an inorganic composition comprising at least one of an oxide, hydroxide, carbonate, borate, stearate, chloride or bromide of zinc, magnesium, molybdenum, antimony, aluminium, tin, copper, manganese, cobalt or iron.

The invention further extends to a method of manufacturing an acrylic material which comprises:
a) 24.9 to 94.9% by wt of an acrylic composition;
b) 5 to 75% by wt of a halogen containing polymer which contains between 5 to 70% by wt of halogen;
c) 0.1 to 25% by wt of an inorganic composition comprising at least one of an oxide, hydroxide, carbonate, borate, stearate, chloride or bromide of zinc, magnesium, molybdenum, antimony, aluminium, tin, copper, manganese, cobalt or iron which process comprises melt blending, by extrusion, between 150 to 250° C., said acrylic composition, said halogen containing polymer and said inorganic composition.

An acrylic material as described herein may be supplied in the form of pellets. The pellets may then be thermally processed for any downstream application. Alternatively, a solid form (e.g. pellets) comprising said acrylic composition and said inorganic composition may be supplied for subsequent mixing with a said halogen-containing polymer. Thus, the invention extends to a solid form comprising said acrylic composition and said inorganic composition, wherein the "% by wt" expressed herein for said acrylic material and said inorganic composition represent "parts by weight" in said solid form.

The invention extends to a flame retardant component comprising an acrylic material according to said first aspect or manufactured in a method according to the second aspect.

Said component may be a coextruded or laminated component which includes said acrylic material.

Said component may be for use in construction.

Said component may be for use in construction of a building. For example, it could be a solid or coextruded building component, for example a soffit board, barge board, fascia board, cladding board, siding, gutter, pipe, shutter, window casement, window board, window profile, conservatory profile, door panel, door casement, roofing panel, architectural accessory or the like.

Said component may be for use in constructing a vehicle or in another automotive application, both as a bulk material or as a coextruded laminate. Such applications include, but are not limited to, decorative exterior trim, vehicle cab moldings, bumpers (fenders), louvers, rear panels, accessories for buses, trucks, vans, campers, farm vehicles and mass transit vehicles, side and quarter panel trim or the like.

Said component may be used in indoor applications for example bathtubs, spas, shower stalls, counters, bathroom fixtures, toilet seats, kitchen housewares, sinks, and refrigerator liners or bodies. Said component may be used in outdoor applications, for example for fencing, trash cans, garden furniture, spas, signage and trim for signage use, such as for petrol stations (or the like). Outdoor applications suitably include the building and automotive components which are subjected to the external environment.

The invention further extends to a flame retardant component for an outdoor application comprising an acrylic material according to said first aspect or manufactured in a method according to the second aspect The invention further extends to a flame retardant extrusion comprising an acrylic material according to said first aspect or manufactured in a method according to the second aspect.

The invention extends to the use of a component made of an acrylic material according to the first aspect or manufactured in a method according to the second aspect in construction and/or in outdoor applications.

The invention extends to a building comprising a component made out of an acrylic material according to the first aspect or manufactured in a method according to the second aspect.

The invention extends to a component which includes a substrate and a capstock material wherein at least one of either the substrate or the capstock material is an acrylic material according to the first aspect or manufactured in a method according to the second aspect.

The acrylic material of the first aspect and/or a component for a use as described herein may have a size in at least one direction of at least 1 cm, suitably at least 5 cm, preferably at least 10 cm. Said material and/or component may have a volume of at least 50 $cm^3$ preferably at least 100 $cm^3$, more preferably at least 500 $cm^3$, especially at least 1000 $cm^3$.

Any feature of any aspect of any invention or embodiment described herein may be combined with any feature of any aspect of any other invention or embodiment described herein.

The invention will be further described with reference to the following Examples.

EXAMPLE 1

Preparation of Acrylic Material

A mixture of 40% by wt uPVC (containing 5% titanium dioxide, 8–10% calcium carbonate, 3% viscosity modifiers and 0.5 to 1% thermal stabilisers, 56% by wt of an acrylic copolymer comprising methylmethacrylate (97%) and ethyl acrylate (3%), 2% by wt zinc stannate (Flamtard S ex Alcan), 1% by wt magnesium hydroxide, 1% by wt zinc borate and UV stabiliser (Tinuvin P from Ciba-Geigy) was compounded by extrusion at 190° C. in a co-rotating, vacuum vented twin screw extruder. The acrylic material was then extruded at 190° C. to form a sheet nominally 4 mm in thickness.

EXAMPLE 2

Surface Spread of Flame Test for the Acrylic Material

A sample of the sheet (885×267 mm) was tested according to BS476 Part 7 surface spread of flame test. The distance the material burned along a reference line positioned 100 mm above the lower edge of the sample was measured. The sample was found to burn a maximum distance of 600 mm after 410 seconds.

EXAMPLE 3

Comparative-Surface Spread of Flame Test for Acrylic Copolymer

A sample of a sheet (885×267 mm) of an acrylic copolymer comprising methylmethacrylate (97%) and ethyl acrylate (3%) and UV stabiliser was tested according to BS476 Part 7 surface spread of flame test. This sample was found to have burned to 600 mm in 240 seconds.

EXAMPLE 4

A composition comprising 54.5% by weight of a standard acrylic moulding polymer (Diakon™ MG102 available from Ineos Acrylics), 40% by weight unplasticised PVC, 1% $Mg(OH)_2$, 2% zinc stannate and 2% zinc borate together with 0.5% UV stabiliser (Tinuvin P from Ciba-Geigy) and 0.2% of a thermal stabiliser (Irganox 1076 from Ciba-Geigy) was melt blended as described in Example 1. The burning properties were measured, together with those of a sample made from unmodified MG102. The heat release rate was measured by cone calorimetry using a method described in ISO 5660 using an incident heat flux of 40 $kW/m^2$ and square samples measuring 100×100 mm×4 mm thickness. The results are shown in Table 2.

TABLE 2

| Composition | steady state rate of heat release ($kW/m^2$) | peal rate of heat release ($kW/m^2$) |
|---|---|---|
| MG102 | 650 | 750 |
| Modified MG102 | 120 | 250 |

EXAMPLE 5

Preparation of Acrylic Material as a Laminate with Foamed uPVC

A mixture of 30% by wt uPVC (obtained from EVC), 50% by wt of a commercially available, high melt flow, impact-modified, acrylic moulding copolymer comprising methylmethacrylate and ethyl acrylate, 2% by wt zinc stannate, 10% by wt magnesium hydroxide, 8% w/w colour masterbatch (a 50% pigment dispersion in acrylic) and UV stabiliser (Tinuvin P from Ciba-Geigy) was compounded by extrusion at 190° C. in a co-rotating, vacuum vented twin screw extruder. The acrylic material was then coextruded at 100 μm thickness onto foamed uPVC to form a nominally 6 mm cladding board.

EXAMPLE 6

Surface Spread of Flame Test for the Acrylic/Foamed uPVC Laminate

A sample of the sheet (885×267 mm) from Example 5 was tested using the BS476 Part 7 surface spread of flame apparatus. The distance the material burned along a reference line positioned 100 mm above the lower edge of the sample was measured. The sample was found to burn to less than 100 mm after 90 seconds and to less than 100 mm after 600 seconds.

EXAMPLE 7

Comparative-Surface Spread of Flame Test for Acrylic Copolymer/Foamed uPVC Laminate A sample of nominally 6 mm cladding board (885×267 mm) comprising a 100 μm capstock of an acrylic copolymer on a foamed uPVC substrate was also tested. The acrylic copolymer comprised a commercially available, high melt flow, impact modified, acrylic moulding copolymer of methylmethacrylate and ethylacrylate, UV stabiliser and 8% w/w colour masterbatch (a 50% pigment dispersion in acrylic). In the BS476 Part 7 surface spread of flame apparatus this sample was found to have burned to greater than 370 mm in 90 seconds and less than 650 mm after 600 seconds.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. An acrylic material which comprises:
    a) 4.9 to 94.9% by wt of an acrylic composition, said acrylic composition comprising a homopolymer of an alkyl (alk)acrylate or a copolymer made by polymerising a monomer mixture comprising 50 to 90 wt % of an alkyl methacrylate and 1 to 50 wt % of an alkyl acrylate;
    b) 5 to 95% by wt of a chlorine-containing polymer which contains between 5 to 70% by wt of halogen;
    c) 0.1 to 25% by wt of an inorganic composition select from the group consisting of (i) magnesium hydroxide and an oxide of antimony; (ii) magnesium hydroxide and zinc stannate; and (iii) magnesium hydroxide and zinc oxide.

2. An acrylic material as claimed in claim 1, wherein said acrylic composition is present in an amount of 24.9 to 94.9% by wt of the acrylic material; and said chlorine-containing polymer is present in an amount of 5 to 75% by wt of the acrylic material.

3. An acrylic material as claimed in claim 1 wherein said inorganic composition comprises magnesium hydroxide and an oxide of antimony.

4. An acrylic material as claimed in claim 1 wherein said inorganic composition consists essentially of magnesium hydroxide and zinc oxide, and said acrylic material optionally includes an additive selected from the group consisting of UV stabilisers, colorants and lubricants.

5. An acrylic material as claimed in claim 1 wherein said inorganic composition comprises magnesium hydroxide and zinc oxide.

6. An acrylic material as claimed in claim 2 wherein said inorganic composition comprises magnesium hydroxide and zinc oxide.

7. An acrylic material as claimed in claim 1 wherein said inorganic composition comprises magnesium hydroxide and zinc stannate.

8. An acrylic material as claimed in claim 2 wherein said inorganic composition comprises magnesium hydroxide and zinc stannate.

9. An acrylic material as claimed in claim 7 wherein said inorganic composition further includes zinc borate.

10. An acrylic material as claimed in claim 1 wherein said acrylic composition is a homo or copolymer of at least one monome selected from the group consisting of (1) alkyl acrylates, in which alkyl contains 1 to 6 carbon atoms, and (2) alkyl methacrylate, wherein alkyl is 1 to 6 carbon atoms.

11. An acrylic material as claimed in claim 1 wherein said acrylic composition comprises a copolymer made by polymerising a monomer mixture comprising 50–90 wt % of an alkyl methacrylate and 1–50 wt % of an alkyl acrylate.

12. An acrylic material as claimed in claim 1 wherein said acrylic composition comprises 20–60 wt % of a rubbery copolymer.

13. An acrylic material as claimed in claim 1 wherein said chlorine-containing polymer is a polymer or copolymer of vinyl chloride or vinylidene chloride.

14. An acrylic material as claimed in claim 1 wherein said chlorine-containing polymer includes at least 10% by wt of halogen.

15. An acrylic material as claimed in claim 1 wherein said chlorine-containing polymer includes no halogen other than chlorine.

16. An acrylic material as claimed in claim 1 which includes at least 10% by wt and 75% by wt or less of said chlorine-containing polymer.

17. An acrylic material as claimed in claim 1 wherein said acrylic material includes at least 30% by wt and 90% by wt or less of said acrylic composition.

18. An acrylic material as claimed in claim 1 which includes at least 0.5% by weight of said inorganic composition.

19. An acrylic material as claimed in claim 1 wherein the ratio of the weight of said acrylic composition to said chlorine-containing polymer is at least 0.5 and is less than 10.

20. An acrylic material as claimed in claim 1 wherein the ratio of the weight of said acrylic composition to said inorganic composition is at least 8 and less than 30.

21. A flame retardant component for use in construction comprising an acrylic material as defined in claim 1.

22. A flame retardant component for use in construction comprising an acrylic material as defined in claim 1, wherein said component is a solid or coextruded building component.

23. A building component comprising an acrylic material as defined in claim 1.

24. A component which includes a substrate and a capstock material, wherein at least one of either the substrate or the capstock material is an acrylic material as defined in claim 1.

25. An acrylic material as claimed in claim 1 wherein the acrylic material is in the form of sheets, films, powders or granules.

26. An article of manufacture comprising an acrylic material as defined in claim 1.

27. A method of manufacturing an acrylic material as defined in claim 1 which method comprises melt-blending said acrylic composition, said chlorine-containing polymer and said inorganic composition.

28. A method according to claim 27 wherein the method comprises melt-blending by extrusion the inorganic composition and the acrylic composition together at a temperature between 150° C. and 230° C., followed by melt-bending with the chlorine-containing polymer.

29. A method according to claim 27 wherein the method comprises melt-blending by extrusion the inorganic composition, the acrylic composition and the chlorine-containing polymer all together at a temperature between 150° C. and 230° C.

30. An acrylic material which comprises:
   a) 4.9 to 94.9% by wt of an acrylic composition selected from the group consisting of (i) a homopolymer of an alkyl (alk)acrylate; or (ii) a copolymer an alkyl (alk) acrylate;
   b) 5 to 95% by wt of a chlorine-containing polymer which contains between 5 to 70% by wt of halogen;
   c) 0.1 to 25% by wt of an inorganic composition comprising magnesium hydroxide and an oxide of antimony.

31. An acrylic material as claimed in claim 1 wherein said acrylic composition comprises a copolymer made by polymerising a monomer mixture comprising 50 to 90 wt % of methyl methacrylate and 1 to 50 wt % of an alkyl acrylate.

32. An acrylic material as claimed in claim 31 wherein said alkyl acrylate comprises a $C_1$–$C_4$ alkyl acrylate.

* * * * *